US010832283B1

(12) United States Patent
Angelopoulos et al.

(10) Patent No.: US 10,832,283 B1
(45) Date of Patent: Nov. 10, 2020

(54) SYSTEM, METHOD, AND COMPUTER PROGRAM FOR PROVIDING AN INSTANCE OF A PROMOTIONAL MESSAGE TO A USER BASED ON A PREDICTED EMOTIONAL RESPONSE CORRESPONDING TO USER CHARACTERISTICS

(71) Applicant: Persado Intellectual Property Limited, London (GB)

(72) Inventors: Panagiotis Angelopoulos, Long Island City, NY (US); Assaf Baciu, London (GB)

(73) Assignee: Persado Intellectual Property Limited, London (GB)

( * ) Notice: Subject to any disclaimer, the term of this patent is extended or adjusted under 35 U.S.C. 154(b) by 247 days.

(21) Appl. No.: 15/373,271

(22) Filed: Dec. 8, 2016

Related U.S. Application Data

(60) Provisional application No. 62/265,286, filed on Dec. 9, 2015.

(51) Int. Cl.
*G06Q 30/02* (2012.01)
*G06Q 10/06* (2012.01)
(Continued)

(52) U.S. Cl.
CPC ........... *G06Q 30/0254* (2013.01); *G06N 5/04* (2013.01); *G06N 20/00* (2019.01); *G06Q 10/067* (2013.01)

(58) Field of Classification Search
CPC .... G06Q 30/0254; G06Q 10/067; G06N 5/04; G06N 99/005
(Continued)

(56) References Cited

U.S. PATENT DOCUMENTS 4,930,077 A     5/1990   Fan
5,173,854 A    12/1992   Kaufman et al.
(Continued)

FOREIGN PATENT DOCUMENTS

KR    20050021126 A  *  3/2005
WO         0148666        7/2001
(Continued)

OTHER PUBLICATIONS

Eli J. Finkel, Online Dating a Critical Analysis From the Perspective of Psychological Science, 2012 (Year: 2012).*
(Continued)

*Primary Examiner* — Tarek Elchanti
(74) *Attorney, Agent, or Firm* — Lessani Law Group, PC

(57) ABSTRACT

The present disclosure describes a system, method, and computer program for automatically predicting the emotion(s) to which a user is most likely to respond based on user characteristics and for tailoring a marketing message to a user based on the predicted emotion(s). A statistical model is created that predicts how a user with certain characteristics will respond to certain emotions. User characteristics are the input to the model, and, for each of a set of emotions, the output is the probability of a corresponding user responding to a message with the emotion. The statistical model is used to generate promotional messages that are tailored to each user based on the emotion to which the user is predicted to respond best, given the user's characteristics.

31 Claims, 6 Drawing Sheets

(51) Int. Cl.
*G06N 5/04* (2006.01)
*G06N 20/00* (2019.01)

(58) Field of Classification Search
USPC .......................................... 705/14.52, 14.43
See application file for complete search history.

(56) References Cited

U.S. PATENT DOCUMENTS

| | | | |
|---|---|---|---|
| 5,652,828 | A | 7/1997 | Silverman |
| 6,278,967 | B1 | 8/2001 | Akers et al. |
| 6,400,996 | B1 | 6/2002 | Hoffberg et al. |
| 6,470,306 | B1 | 10/2002 | Pringle et al. |
| 6,647,383 | B1 | 11/2003 | August et al. |
| 6,687,404 | B1 | 2/2004 | Hull et al. |
| 6,760,695 | B1 | 7/2004 | Kuno et al. |
| 6,934,748 | B1 | 8/2005 | Louviere et al. |
| 6,978,239 | B2 | 12/2005 | Chu et al. |
| 7,006,881 | B1 | 2/2006 | Hoffberg et al. |
| 7,013,427 | B2 | 3/2006 | Griffith |
| 7,130,808 | B1 | 10/2006 | Ranka et al. |
| 7,133,834 | B1 | 11/2006 | Abelow |
| 7,137,126 | B1 | 11/2006 | Coffman et al. |
| 7,167,825 | B1 | 1/2007 | Potter |
| 7,181,438 | B1 | 2/2007 | Szabo |
| 7,302,383 | B2 | 11/2007 | Valles |
| 7,363,214 | B2 | 4/2008 | Musgrove et al. |
| 7,406,434 | B1 | 7/2008 | Chang et al. |
| 7,493,250 | B2 | 2/2009 | Hecht et al. |
| 7,769,623 | B2 | 8/2010 | Mittal et al. |
| 7,797,699 | B2 | 9/2010 | Kagi et al. |
| 7,945,573 | B1 | 5/2011 | Barnes et al. |
| 8,260,663 | B1 | 9/2012 | Ranka et al. |
| 8,689,253 | B2 | 4/2014 | Hallberg et al. |
| 8,762,496 | B1 | 6/2014 | Kiveris |
| 9,268,769 | B1 | 2/2016 | Shalit et al. |
| 10,269,028 | B2 | 4/2019 | Vratskides et al. |
| 2002/0156688 | A1 | 10/2002 | Horn et al. |
| 2002/0174144 | A1 | 11/2002 | Wolpe |
| 2005/0027507 | A1 | 2/2005 | Patrudu |
| 2005/0039116 | A1 | 2/2005 | Slack-Smith |
| 2005/0060643 | A1 | 3/2005 | Glass et al. |
| 2005/0076003 | A1 | 7/2005 | DuBose et al. |
| 2005/0234850 | A1 | 10/2005 | Buchheit et al. |
| 2006/0155567 | A1 | 7/2006 | Walker et al. |
| 2006/0212524 | A1 | 9/2006 | Wu et al. |
| 2006/0259360 | A1 | 11/2006 | Flinn et al. |
| 2007/0033002 | A1 | 2/2007 | Dymetman et al. |
| 2007/0055931 | A1 | 3/2007 | Zaima et al. |
| 2007/0127688 | A1 | 6/2007 | Doulton |
| 2007/0153989 | A1 | 7/2007 | Howell et al. |
| 2007/0168863 | A1 | 7/2007 | Blattner et al. |
| 2007/0233566 | A1 | 10/2007 | Zlotkin et al. |
| 2007/0239444 | A1 | 10/2007 | Ma |
| 2007/0260740 | A1 | 11/2007 | Guan |
| 2007/0281286 | A1 | 12/2007 | Palacios |
| 2008/0059149 | A1 | 3/2008 | Martin |
| 2008/0109285 | A1 | 5/2008 | Reuther et al. |
| 2008/0178073 | A1 | 7/2008 | Gao et al. |
| 2008/0255944 | A1 | 10/2008 | Shah et al. |
| 2008/0281627 | A1 | 11/2008 | Chang et al. |
| 2008/0300857 | A1 | 12/2008 | Barbaiani et al. |
| 2008/0313259 | A1 | 12/2008 | Correa |
| 2009/0063262 | A1 | 3/2009 | Mason |
| 2009/0110268 | A1 | 4/2009 | Dejean et al. |
| 2009/0150400 | A1 | 6/2009 | Abu-Hakima et al. |
| 2009/0177750 | A1 | 7/2009 | Lee et al. |
| 2009/0210899 | A1 | 8/2009 | L Awrence-Apfelbaum et al. |
| 2009/0226098 | A1 | 9/2009 | Takahashi et al. |
| 2009/0254836 | A1 | 10/2009 | Bajrach |
| 2009/0276419 | A1 | 11/2009 | Jones et al. |
| 2009/0313026 | A1 | 12/2009 | Coffman et al. |
| 2010/0100817 | A1 | 4/2010 | Trotter |
| 2010/0241418 | A1 | 9/2010 | Maeda et al. |
| 2010/0312769 | A1 | 12/2010 | Bailey et al. |
| 2010/0312840 | A1 | 12/2010 | Chestnut et al. |
| 2011/0040611 | A1 | 2/2011 | Simmons et al. |
| 2012/0005041 | A1 | 1/2012 | Mehta et al. |
| 2012/0016661 | A1 | 1/2012 | Pinkas |
| 2012/0095831 | A1 | 4/2012 | Aaltonen et al. |
| 2012/0166345 | A1 | 6/2012 | Klemm |
| 2012/0259620 | A1 | 10/2012 | Vratskides et al. |
| 2013/0110617 | A1* | 5/2013 | Phan .................... H04W 4/21 705/14.43 |
| 2013/0311269 | A1 | 11/2013 | Forte et al. |
| 2013/0346870 | A1 | 12/2013 | Greenzeiger et al. |
| 2014/0104370 | A1 | 4/2014 | Calman et al. |

FOREIGN PATENT DOCUMENTS

| | | |
|---|---|---|
| WO | 2001048666 | 7/2001 |
| WO | 2011076318 | 6/2011 |

OTHER PUBLICATIONS

"Drop-Down list", Dec. 21, 2008.
Hill Associates, "Weighted and Round Robin Queuing", Jul. 14, 2007.
Katevenis, M., et al., "Weighted Round-Robin Cell Multiplexing in a General-Purpose ATM Switch Chip", Oct. 1991, IEEE Journal on Selected Areas in Communication, vol. 9, No. 8.
Lee, Jinkyu, et al., "Multiprocessor Real-Time Scheduling Considering Concurrency and Urgency", Special Issue of the Work-in-Progress (WIP) Session at the 2009 IEEE Real-Time Systems Symposium, Washington, D.C., Dec. 1-4, 2009.
Sawyer, Alan G., "Statistical Power and Effect Size in Consumer Research", in NA—Advances in Consumer Research vol. 09, eds, 1982, pp. 1-7.
"Slider (Computing)", Sep. 27, 2007.
Wikipedia "Barrier (computer science)", Sep. 26, 2010.
Wikipedia "Multi-Variate Testing", Sep. 17, 2010.

* cited by examiner

| user | eml | age | ethnicity | gender | lifetimeavgbasket | region | income | anxiety | achievement | ... | Received | Responded |
|---|---|---|---|---|---|---|---|---|---|---|---|---|
| 1 | AOL | [17-35] | [Afroamerican] | [F] | [Medium] | [Northeast] | [15-40] | 0 | 0 | ... | 1 | 0 |
| 2 | AOL | [17-35] | [Afroamerican] | [M] | [High] | [Midwest] | [15-40] | 1 | 1 | ... | 1 | 0 |
| 3 | AOL | [17-35] | [Afroamerican] | [M] | [Low] | [South] | [15-40] | 0 | 0 | ... | 1 | 0 |
| 4 | AOL | [17-35] | [Caucasian] | [F] | [High] | [Midwest] | [50-100] | 1 | 1 | ... | 1 | 0 |
| 5 | AOL | [17-35] | [Caucasian] | [F] | [Low] | [Midwest] | [50-100] | 1 | 1 | ... | 1 | 1 |
| 6 | AOL | [17-35] | [Caucasian] | [F] | [Low] | [Northeast] | [50-100] | 1 | 0 | ... | 1 | 1 |
| 7 | AOL | [17-35] | [Caucasian] | [F] | [Medium] | [Midwest] | [50-100] | 0 | 1 | ... | 1 | 0 |
| 8 | AOL | [17-35] | [Caucasian] | [F] | [Medium] | [Northeast] | [50-100] | 0 | 0 | ... | 1 | 0 |
| 9 | AOL | [17-35] | [Caucasian] | [M] | [High] | [Northeast] | [50-100] | 0 | 1 | ... | 1 | 0 |
| 10 | AOL | [17-35] | [Caucasian] | [M] | [High] | [South] | [40-50] | 0 | 0 | ... | 1 | 1 |

FIG. 2

| Emotion 310 | Phrase 320 |
|---|---|
| intimacy | hey there |
| intimacy | it's nice to see you here |
| intimacy | dear customer... |
| intimacy | Welcome |
| intimacy | look who's here |
| celebration | happy holidays |
| celebration | TGIF |
| celebration | let's celebrate |
| celebration | let's get the party started |
| celebration | happy Saturday |
| gratitude | thank you |
| gratitude | you're the best |
| gratitude | we appreciate your loyalty |
| gratitude | our way of saying thanks |
| gratitude | you deserve it |
| relief | Finally |
| relief | the time has come |
| relief | at long last |
| relief | Phew |
| relief | it's about time |
| safety | Confirmed |
| safety | we've got you covered |
| safety | trust us |
| safety | we mean this |
| safety | Guaranteed |
| fascination | let's get you something new |
| fascination | make it yours |
| fascination | you'll want this |
| fascination | new is in the air |
| fascination | you'll be impressed |
| gratification | we're treating you |
| gratification | savings are coming your way |
| gratification | we have a gift for you |
| gratification | this is a truly great deal |
| gratification | you're about to save huge |
| encouragement | let's do this |
| encouragement | treat yourself |
| encouragement | go for it |
| encouragement | you're almost there |
| encouragement | this is YOUR chance |
| curiosity | open this soon |
| curiosity | you have to see this |
| curiosity | check this out |
| curiosity | happening now |
| curiosity | look what we've got here |
| challenge | are you ready? |
| challenge | act smart |
| challenge | are you fast enough? |
| challenge | we dare you to say no |
| challenge | good luck trying to resist this |
| guilt | you're missing out |
| guilt | FOMO alert |
| guilt | don't overthink it |
| guilt | still waiting? |
| guilt | don't let this slip away |
| anxiety | this is important |
| anxiety | Attention |
| anxiety | breaking news |
| anxiety | don't forget |
| anxiety | in case you missed this |
| urgency | don't wait |
| urgency | time is running out |
| urgency | don't miss this |
| urgency | act fast |
| urgency | this is pretty urgent |

FIG. 3

|  |  | Features | | | | | |
|---|---|---|---|---|---|---|---|
| Phrase | Emotion | hey | there | Dear | welcome | about | finally |
| hey there | intimacy | 1 | 1 | 0 | 0 | 0 | 0 |
| welcome | intimacy | 0 | 0 | 0 | 1 | 0 | 0 |
| finally | relief | 0 | 0 | 0 | 0 | 0 | 1 |

FIG. 4

SYSTEM, METHOD, AND COMPUTER PROGRAM FOR PROVIDING AN INSTANCE OF A PROMOTIONAL MESSAGE TO A USER BASED ON A PREDICTED EMOTIONAL RESPONSE CORRESPONDING TO USER CHARACTERISTICS

RELATED APPLICATIONS

This application claims the benefit of U.S. Provisional Application No. 62/265,286, filed on Dec. 9, 2015, and titled "System, Method, and Computer Program for Identifying the Emotional Language in Marketing Messages that a User is Most Likely to Response based on User Characteristics," the contents of which are incorporated by reference as if fully disclosed herein.

BACKGROUND OF THE INVENTION

1. Field of the Invention

This invention relates generally to ad delivery systems and methods, and more specifically, to using machine learning to deliver promotional messages tailored to users' predicted responses to emotions based on user characteristics.

2. Description of the Background Art

Promotional messages (i.e., advertisements and marketing messages) often have an emotional element in them. For example, they may induce intimacy with words and phrases such as "welcome," "dear customer," or "hey there," or they may induce anxiety with words and phrases such as "attention" and "time is running out."

One challenge is that different customers may respond to different emotions. It would be ideal to send a customer or prospective customer a promotional message with the emotional element to which the customer is most likely to respond. Therefore, there is market demand for a system that tailors promotional messages for each user with the emotion most likely to induce a response from the user.

SUMMARY OF THE DISCLOSURE

The present disclosure describes a system, method, and computer program for automatically predicting the emotion(s) to which a user is most likely to respond based on user characteristics and for providing a marketing message associated with the emotion(s) to the user. The method is performed by a computer system (the "system").

The system creates a statistical model that predicts the emotion or combination of emotions to which a user is statistically most likely to respond given the user's characteristics. Specifically, user characteristics are the input to the model, and, for each of a set of emotions, the output is the probability of a corresponding user responding to a message with the emotion.

To build the statistical model, the system receives training data for a plurality of training users. For each training user, the training data includes user characteristics, a set of promotional messages that were previously provided to the user, and, for each message, an indication of whether the training user responded to the message. The system automatically tags each of the promotional messages in the training data with one or more emotional categories. The model is trained using the user characteristics of the training users, the emotions with which the promotional messages are tagged, and the corresponding response rates to the promotional messages.

The system then uses the statistical model to predict the emotion or combination of emotions to which a non-training user is most likely to respond and then provide a promotional message associated with the emotion to the non-training user. Specifically, the system receives user characteristics for a non-training user, and creates a vector of user characteristics. The system applies the vector to the statistical model and derives an emotion or combination of emotions to which the non-training user is most likely to respond. The system then sends the non-training user a promotional message with language associated with an emotion or combination of emotions(s).

In one embodiment, to generate a promotional message for the non-training user, the system retrieves a template promotional message that includes fixed language and one or more emotional variables. The system also accesses a mapping of (1) emotions or combination of emotions to (2) values for the emotional variable. Using the mapping, the system identifies the value of the emotional variable that corresponds to the emotion(s) to which the user has the greatest probability of responding. The system generates a promotional message for the user by creating an instance of the template promotional message and by inserting the identified value(s) for the emotional variable(s) into the instance of the promotional message.

BRIEF DESCRIPTION OF THE DRAWINGS

FIG. 2 is a table with example data used to train the statistical model.

FIG. 3 is a table that illustrates data in an example emotional database.

FIG. 4 is table with example data used to train a training message classifier.

DETAILED DESCRIPTION OF THE PREFERRED EMBODIMENTS

The present disclosure relates to a system, method, and computer program that (1) uses machine-learning-based modeling to predict an emotion or combination of emotions to which a user is most likely to respond based on the user's characteristics and (2) delivers a promotional message with the emotion or combination of emotions. The method is performed by a computer system (the "system").

The method involves two phases. First, a statistical model (or set of statistical models) is created that predicts the emotion or combination of emotions to which a user is statistically most likely to respond given the user's characteristics. Data from a group of users ("training users") is used to train the model. Then, the model is used to predict the emotion(s) to which non-training users are most likely to respond and to provide promotional messages with the applicable emotional elements to the non-training users. Each of these phases is described in more detail below.

Creating a Statistical Model

Figure 1:
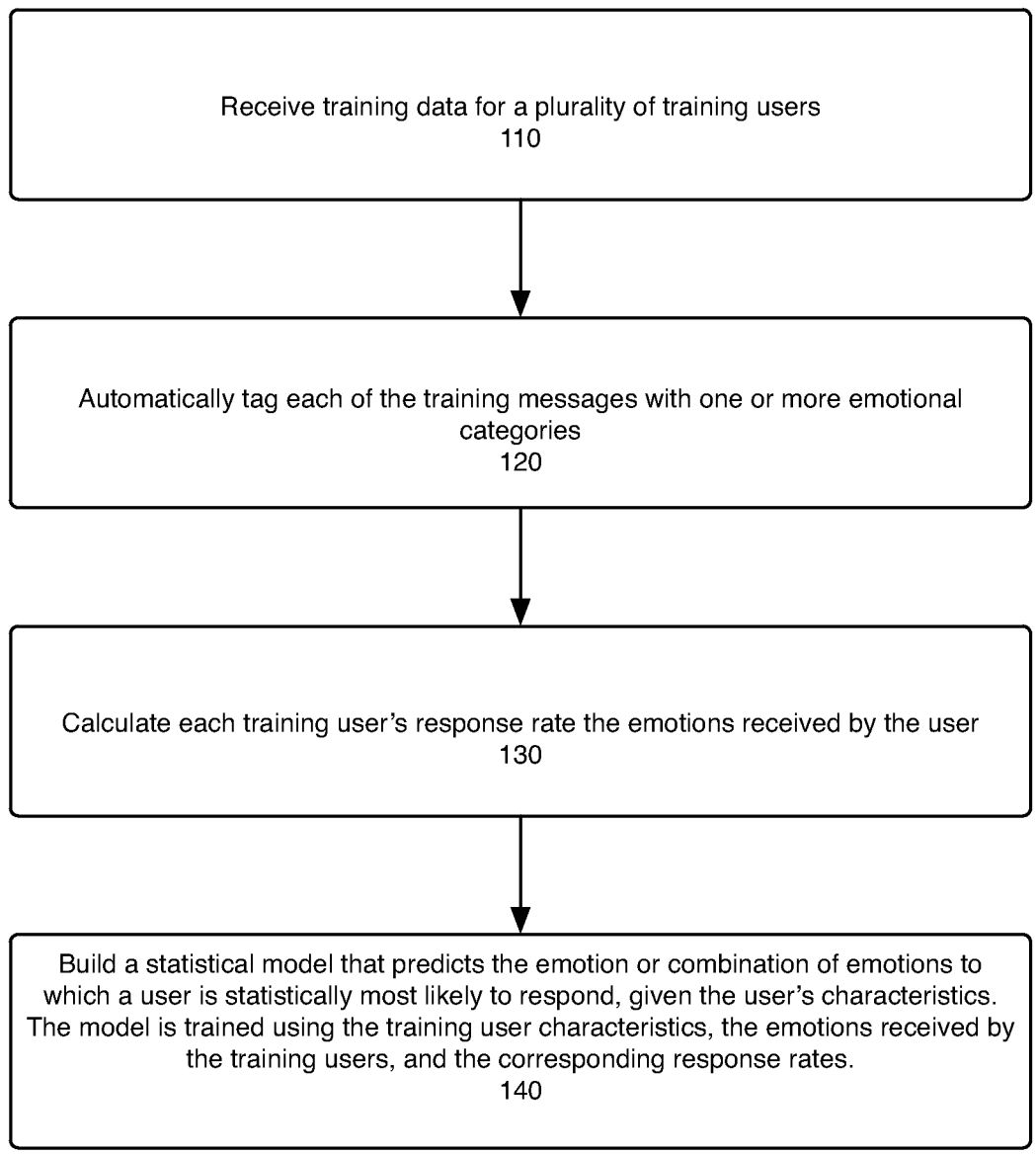
FIG. 1 is a flowchart that illustrate a method, according to one embodiment, for creating a statistical model that predicts the emotion or combination of emotions to which a user is statistically most likely to respond given the user's characteristics.

FIG. 1 illustrates a method for creating a statistical model that, for each of a set of emotions, predicts the probability that a user with certain characteristics will respond to the emotion. The system receives training data for a plurality of training users (step 110). For each training user, the training data includes user characteristics, a set of promotional messages that were previously provided to the user ("training promotional messages"), and, for each training promotional message, an indication of whether the training user responded to the message.

Examples of user characteristics that may be in the training data are:
 Age
 Gender
 Sex
 Ethnicity
 Income
 Zipcode
 Last purchase (on site or with retailer)
 Lifetime spending (on site or with retailer)
 Browsing history (e.g., which sites, how frequently sites are visited, duration on sites, etc.)

The user characteristics may be a subset of the above list or may be characteristics other than the examples listed above.

Examples of a training promotional message (e.g., an ad copy) are:
 A subject line of a promotional email
 A display ad that the training user was exposed to when surfing the web
 An SMS received with a promotional offer
 A push notice to a mobile application
 a smartTV ad that can be clicked on Examples of types of user actions that are considered a response to a message are:
 Opened email or clicked on the email
 Clicked on a display ad
 Replied to an SMS offer via SMS or phone (e.g., called to learn more on an offer received with an SMS)

The system automatically tags each of the training promotional messages with one or more emotional categories (step 120). Methods for tagging the training promotional messages are described in more detail below.

The system calculates each training user's response rate to the emotions received by the user in the training promotional messages (step 130). The system then uses the training data to build a statistical model that predicts the emotion or combination of emotions to which a user is statistically most likely to respond, given the user's characteristics (step 140).

The statistical model is created using a Bayesian network, linear regression, logistical regression, decision trees, k-nearest neighborhoods, random forest, gradient boost, Adaboost, neural networks, support vector machines, or any other statistical machine learning method that can be used for predicting the response rate of a variable given a set of inputs. The following reference describes how such methods can be used to build a statistical prediction model:

Hastie, Trevor; Tibshirani, Robert and Friedman, Jerome. *The Elements of Statistical Learning*. New York, N.Y., USA: Springer New York Inc., 2001.). The contents of this reference are incorporated by reference herein.

The statistical model is trained using the following:
 Training inputs: User characteristics of training users, emotions provided to training users (i.e., the emotional categories identified in step 120 or subset thereof)
 Training outputs (i.e., the target variable): The corresponding response rates for each of the emotions provided This results in a statistical model in which the inputs are user characteristics and, for each of a set of emotions, the output is the probability that the user will respond to the emotion (i.e., there is a probability calculation for each emotion). The set of emotions are the emotions used as inputs in training the model (i.e., the emotional tags from step 120 or a subset thereof). The mathematical formulation of the statistical model is P(response_to_emotion|user characteristics)=f(x). There may be a separate model for each emotion that predicts the probability of a user responding to that emotion given the user characteristics, or there may be one model that predicts a user's probability of response given his characteristics and an emotion or combination of emotions. For convenience, the term "statistical model" herein applies to either scenario and can mean a single statistical model or a set of statistical models.

FIG. 2 illustrates an example of data used to train the statistical model. If logistic regression is applied to the data of FIG. 2, the output model for the emotion "achievement" would look as look as follows:

$P$(achievement=1|user_attributes)=−2.902225+
  0.261273*eml_domain_groupGMAIL+
  0.498607*eml_domain_groupHOTMAIL+
  0.482522*eml_domain_groupOTHER+
  0.117705*eml_domain_groupYAHOO+
  0.092984*age[36-45]+0.236346*age[46-55]+
  0.385144*age[65]+0.367561*age[Unknown]+
  0.283445*ethnicity[Asian]+0.104385*ethnicity
  [Caucasian]+0.214123*ethnicity[Hispanic]+
  0.120514*ethnicity[Unknown]+
  0.256267*gender[$M$]−0.017037*gender
  [Unknown]−0.163719*lifetimeavgbasket[Low]−
  0.129613*lifetimeavgbasket[Medium]−
  0.224782*lifetimeavgbasket[Unknown]+
  0.098516*region[Northeast]+0.038123*region
  [South]+0.067892*region[Unknown]+
  0.154207*region[West]+0.073124*income[15-
  40]−0.003668*income[40-50]+0.128945*income
  [50-100]+0.059399*income[Unknown]+−
  0.117944*last_purchase[13-18]−
  0.196226*last_purchase[18+]+
  0.08442*times_redeem[1-3]+
  0.24628*times_redeem[4+]+
  0.112876*lifetime_trips[1-3]+
  0.025127*lifetime_trips[4-5]

In one embodiment, the system performs the tagging step (i.e., step 120) by parsing the training promotional messages for words and phrases listed in a database of words and phrases categorized with an emotion ("an emotional database"). FIG. 3 illustrates an example of an emotional database. Each of the emotions in column 310 are thought to be induced by the corresponding word or phrase in column 320. The emotional database is generated by experts in the field of copywriting, marketing, and psychology. Various words and phrases are tagged with emotions by using a voting mechanism that assigns the emotion that most experts agree should be attributed to a word or phrase.

For each word or phrase in a training promotional message that appears in the emotional database, the training promotional message is tagged with the emotion corresponding to the matching word or phrase. For example, the phrase, "Attention, get 20% off any purchase" would be tagged with the emotion "anxiety" if the emotional database in FIG. 3 is used. This is because the word "attention" appears in the database and is categorized with the emotion "anxiety." A training promotional message may be tagged with multiple emotions, and, consequently, the model in step 140 can be trained to predict the probability of a user responding to combinations of emotions.

In comparing the training promotional messages to the emotional database, the system may look for approximate matches in addition to exact matches. With approximate matching, the system executes one or more rules that define what is considered a match. A rule may allow for one or more extra words between the words or phrases in the emotional database. For example, consider the promotional message, "Time is now running out. Get this amazing price before it is gone." The emotional database in FIG. 2 does not have the exact phrase "time is now running out," but it does have the phrase "time is running out," which is categorized with the emotion "urgency." If a rule allows for one or more extra words between the words of a phrase in the emotional database, then the example message is tagged with the emotion "urgency."

In addition or as an alternate to comparing promotional messages to an emotional database, the system uses machine-learning-based modeling to tag training promotional messages with an emotion. The system extracts features (i.e., linguistic characteristics) from phrases in the emotional database and creates a statistical model that is trained to identify emotions in other marketing messages. For avoidance of confusion with the statistical model created in step 140, this statistical model will be referred to herein as the "message classifier." The message classifier is used to tag training promotional messages with an emotion, and the statistical model created in step 140 is effectively used to tag users each with an emotion or combinations of emotions to which they are most likely to respond.

The message classifier is trained with data from the emotional database. Specifically, the linguistic features of phrases in the emotional database are the inputs used to train the training message classifier, and the output is the corresponding emotional category. The mathematical formulation of the message classifier is P(emotional_category|features)=f(x).

The linguistic features used as inputs to message classifier include one or more of the following: words of a phrase, the part of speech of each word, the order which the words appear in the phrase, combinations of words (n-grams), length of phrase, synonyms of words in the phrase. For example, the phrase, "we have a gift for you" includes the following features:

Words: "we," "have," "gift," "for," and "you"
Synonyms: "present"
Word combinations (bigrams): "we have," "have gift," "gift for," and "for you."
Length of phrase: 6

FIG. 4 illustrates an example of input to train the training message classifier. For simplicity, the only linguistic features displayed in FIG. 4 are the words of the input phrases, but any of the above-listed features could be used.

Any method of classification in statistical machine learning, such as logistic regression, decision tress, k-nearest neighborhoods, gradient boost, Adaboost, Bayesian networks, the perceptron algorithm, neural networks, random forests, and support vector machines, may be used to build a message classifier that maximizes the probability of a message belonging to an emotional category given the linguistic features of the message.

To tag a training promotional message with one or more emotions in step 120 (FIG. 1) using the message classifier, the system extracts linguistic features (i.e., the same features used to build the classifier) from the training promotional message. A vector of the linguistic features is created and applied to the message classifier, which outputs one or more emotional categories for the training promotional message.

Figure 5:
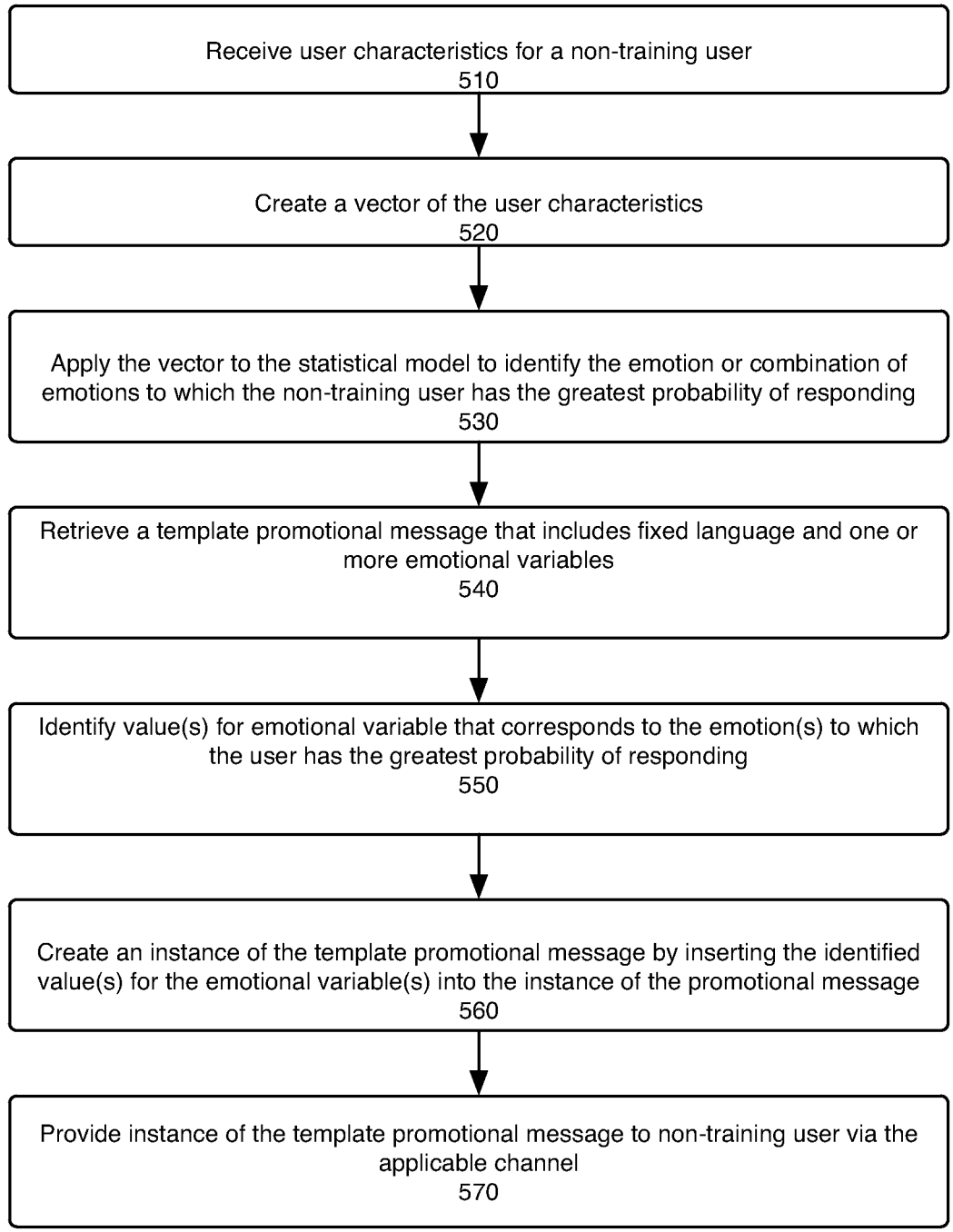
FIG. 5 is a flowchart that illustrates a method, according to one embodiment, for using the statistical model to identify the emotion or combination of emotions to which a non-training user is most likely to respond and then tailor the promotional message to the non-training user.

Using the Statistical Model to Tailor Instances of Messages to Non-Training Users FIG. 5 illustrates a method for using the statistical model to predict the emotion or combination of emotions to which a non-training user is most likely to respond and then tailor the promotional message to the non-training user. The system receives user characteristics for a non-training user (step 510). If the method is being used to generate ads or other promotional messages for a webpage, a browser client may provide the user characteristics to the system in the form of a cookie. If the non-training user logs into the website, the user characteristics may be obtained from the non-training user's profile on the website. For SMS, email, and smartTV promotional messages, the advertiser may provide a database table with non-training user characteristics.

The system creates a vector of user characteristics (step 520). The system applies the vector to the statistical model created in step 140 to identify the emotion or combination of emotions to which the non-training user has the highest probability of responding (step 530).

To generate a promotional message for the non-training user, the system retrieves a template promotional message that includes fixed language and one or more emotional variables (step 540). An example of a template promotional message is "<emotional variable> 20% off your purchase." The system also accesses a mapping of emotions or combination of emotions to values for the emotional variable, and identifies the value of the emotional variable that corresponds to the emotion(s) to which the user has the greatest probability of responding (step 550). The template promotional message and the mapping of emotional variables-to-values may be provided by the advertiser or administrator of the system.

The system creates an instance of the template promotional message by inserting the identified value(s) for the emotional variable(s) into the instance of the promotional message (step 560). For example, if a user is deemed to respond best to urgency and the value for urgency is "Don't wait," an instance of the above template message tailored to the user is "Don't wait, 20% off your purchase."

In certain embodiments, the statistical model predicts a combination of emotions to which the user is most likely to respond. In such embodiments, there may be multiple emotional variables in a template marketing message to enable the system to generate a message with the combination of emotions to which the user is most likely to respond.

The system provides the instance of the template promotional message to the non-training user (570) via the applicable channel (e.g., display in webpage, push to mobile application, SMS, TV ad, email, etc.).

The method of FIG. 5 may be performed in real-time, such as when delivering an ad to a webpage or delivering a push message to a mobile application (i.e., the method may be performed in real-time when user visits the webpage or uses the mobile application). Alternatively, steps 510-560 may be performed offline to the extent applicable to other channels.

In certain embodiments, instead of using a template message with an emotional variable, the system may select a promotional message to send a user from a plurality of complete messages, each conveying a different specific emotion (i.e., having language associated with a specific emotion or combination of emotions). In such embodiments, the system uses the emotion(s) identified in step 530 to determine which of the promotional messages to send the user.

The statistical model and the method of FIG. 5 also may be used to send messages to training users after the initial training period. The method was described with respect to non-training users to emphasize that the statistical model can be applied to a different set of users than the users used to train the model. This is because the method of FIG. 5 does not require that users be uniquely identified; it requires only a set of user characteristics to determine the emotion to which the user is most likely to respond.

Furthermore, the statistical model can be retrained on an on-going basis based on the user characteristics and response rates of the non-training users after the initial training period. In this sense, the non-training users subsequently become training users after the statistical model is initially applied to them.

Example System Architecture

Figure 6:
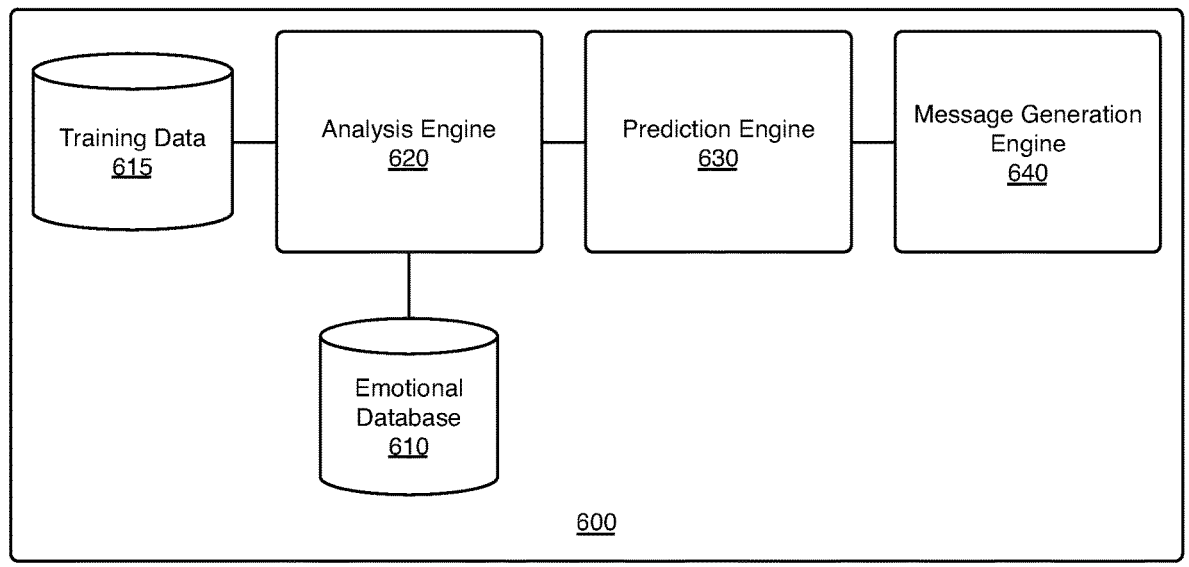
FIG. 6 is a block diagram that illustrates an example software architecture.

FIG. 6 illustrates an example software architecture for the implementing the methods described above. FIG. 6 is only an example and the methods may be implemented using other architectures.

The system 600 of FIG. 6 includes an emotional database 610, a training data database 615, an analysis engine 620, a prediction engine 630, and a message generation engine 640. In accordance with the above-described methods, the analysis engine 610 creates a statistical model that predicts the emotion or combination of emotions to which a user is statistically most likely to respond given the user's characteristics. To train the model, the analysis engine 620 accesses user characteristics, promotional messages, and corresponding response data for training users from database 615. The training promotional messages are tagged with one or more emotions using the emotional database 610.

When a promotional message needs to be generated for a non-training user, the prediction engine 630 inputs the non-training user characteristics to the statistical model or set of statistical model to identify the emotion or combination of emotions to which the user is most likely to respond. The prediction engine 630 provides the identified emotion to the message generation engine 640, which uses the emotion to creates an instance of a template promotional message for the non-training user as described with respect to FIG. 5.

Alternate Embodiment

In some cases, the only information known about the user may be the user's phone number, email address, or other unique identifier for the user ("unique ID). In such case, a statistical model is created in accordance with FIG. 1, except that the unique ID for the user is used as the only user characteristic. In other words, in training the model, the inputs are the unique IDs of the training users and the emotions provided to the users, and the outputs are whether the users responded to the emotions. The model predicts the emotion to which a user is mostly likely to respond given the user's unique ID.

In this embodiment, the statistical model is used to tailor future messages to the training users. For example, to generate a new message for a training user, the user's unique ID is applied to the statistical model to identify the emotion to which the training user is most likely to respond. The system uses the identified emotion to tailor a new promotional message to the training user.

General

The methods described herein are embodied in software and performed by a computer system (comprising one or more computing devices) executing the software. A person skilled in the art would understand that a computer system has one or more memory units, disks, or other physical, computer-readable storage media for storing software instructions, as well as one or more processors for executing the software instructions.

As will be understood by those familiar with the art, the invention may be embodied in other specific forms without departing from the spirit or essential characteristics thereof. Accordingly, the above disclosure is intended to be illustrative, but not limiting, of the scope of the invention, which is set forth in the following claims.

The invention claimed is:

1. A method, performed by a computer system, for providing a promotional message to a user based on a predicted emotional response, the method comprising:

creating a statistical model that, for each of a set of emotions, predicts the probability that a user with certain characteristics will respond to the emotion, wherein creating the model comprises:

receiving training data related to a plurality of training users, wherein, for each training user, the training data received includes user characteristics, a plurality of promotional messages provided to the training user, and, for each of the messages, an indication of whether the training user responded to the message;

automatically tagging each of the promotional messages in the training data with one or more emotions to identify the emotions received by the training users; and building the statistical model using a statistical machine learning algorithm, wherein the model is trained using the user characteristics of the training users, the emotions provided to the training users, and the corresponding response data;

using machine-learning-based modeling to automatically predict the emotion to which a non-training user is most likely to respond and to use the prediction to provide a promotional message to the non-training user by performing the following:

receiving user characteristics for a non-training user;

creating a vector of the user characteristics;

applying the vector of user characteristics to the statistical model to identify an emotion to which the non-training user has the greatest probability of responding; and providing the non-training user with a promotional message that includes language associated with the identified emotion.

2. The method of claim 1, wherein automatically tagging each of the promotional messages in the training data comprises comparing words and phrases in the promotional messages with a database of words and phrases with known emotional association.

3. The method of claim 2, wherein approximate matching is used to map words or phrases in the promotional messages to approximate matches in the database.

4. The method of claim 1, wherein automatically tagging each of the messages in the training data comprises:

building a second statistical model that maps features of phrases to emotional categories, wherein the model is built using features of tagged words and phrases as the input and using the emotional category as the output; and extracting features of phrases from each of the promotional messages in the training data;
for each of the promotional messages, creating a vector of the features in the message; and
applying the vector to the second statistical model to classify the promotional message with an emotion or combination of emotions.

5. The method of claim 1, wherein the statistical model predicts a combination of emotions to which the non-training user has the greatest probability of responding and wherein the promotional messages provided to the non-training user includes language associated with the combination of emotions.

6. The method of claim 1, wherein the statistical model comprises a plurality of models each corresponding to one of a set of emotions, wherein the input for each model is user characteristics and the output is a probability of responding to a certain emotion.

7. The method of claim 1, wherein the statistical machine learning algorithm is one of the following: Bayesian network, linear regression, logistical regression, decision trees, k-nearest neighborhoods, random forest, gradient boost, Adaboost, neural networks, and support vector machines.

8. The method of claim 7, wherein the statistical model is training using a set of inputs and values for a target variable, wherein the set of inputs are the user characteristics of the training users and the emotions received by the training users, and the values for the target variable are the corresponding response rates of the training users for each of the emotions received.

9. A non-transitory computer-readable medium comprising a computer program, that, when executed by a computer system, enables the computer system to perform the following method for providing a promotional message to a user based on a predicted emotional response, the method comprising:
creating a statistical model that, for each of a set of emotions, predicts the probability that a user with certain characteristics will respond to the emotion, wherein creating the model comprises:
receiving training data related to a plurality of training users, wherein, for each training user, the training data received includes user characteristics, a plurality of promotional messages provided to the training user, and, for each of the messages, an indication of whether the training user responded to the message;
automatically tagging each of the promotional messages in the training data with one or more emotions to identify the emotions received by the training users; and
building the statistical model using a statistical machine learning algorithm, wherein the model is trained using the user characteristics of the training users, the emotions provided to the training users, and the corresponding response data;
using machine-learning-based modeling to automatically predict the emotion to which a non-training user is most likely to respond and to use the prediction to provide a promotional message to the non-training user by performing the following:
receiving user characteristics for a non-training user;
creating a vector of the user characteristics;
applying the vector of user characteristics to the statistical model to identify an emotion to which the non-training user has the greatest probability of responding; and
providing the non-training user with a promotional message that includes language associated with the identified emotion.

10. The non-transitory computer-readable medium of claim 9, wherein automatically tagging each of the promotional messages in the training data comprises comparing words and phrases in the promotional messages with a database of words and phrases with known emotional association.

11. The non-transitory computer-readable medium of claim 10, wherein approximate matching is used to map words or phrases in the promotional messages to approximate matches in the database.

12. The non-transitory computer-readable medium of claim 9, wherein automatically tagging each of the messages in the training data comprises:
building a second statistical model that maps features of phrases to emotional categories, wherein the model is built using features of tagged words and phrases as the input and using the emotional category as the output; and
extracting features of phrases from each of the promotional messages in the training data;
for each of the promotional messages, creating a vector of the features in the message; and
applying the vector to the second statistical model to classify the promotional message with an emotion or combination of emotions.

13. The non-transitory computer-readable medium of claim 9, wherein the statistical model predicts a combination of emotions to which the non-training user has the greatest probability of responding and wherein the promotional messages provided to the non-training user includes language associated with the combination of emotions.

14. The non-transitory computer-readable medium of claim 9, wherein the statistical model comprises a plurality of models each corresponding to one of a set of emotions, wherein the input for each model is user characteristics and the output is a probability of responding to a certain emotion.

15. The non-transitory computer-readable medium of claim 9, wherein the statistical machine learning algorithm is one of the following: Bayesian network, linear regression, logistical regression, decision trees, k-nearest neighborhoods, random forest, gradient boost, Adaboost, neural networks, and support vector machines.

16. The non-transitory computer-readable medium of claim 15, wherein the statistical model is training using a set of inputs and values for a target variable, wherein the set of inputs are the user characteristics of the training users and the emotions received by the training users, and the values for the target variable are the corresponding response rates of the training users for each of the emotions received.

17. A computer system for providing a promotional message to a user based on a predicted emotional response, the system comprising:
one or more processors;
one or more memory units coupled to the one or more processors, wherein the one or more memory units store instructions that, when executed by the one or more processors, cause the system to perform the operations of:
creating a statistical model that, for each of a set of emotions, predicts the probability that a user with certain characteristics will respond to the emotion, wherein creating the model comprises:

receiving training data related to a plurality of training users, wherein, for each training user, the training data received includes user characteristics, a plurality of promotional messages provided to the training user, and, for each of the messages, an indication of whether the training user responded to the message;

automatically tagging each of the promotional messages in the training data with one or more emotions to identify the emotions received by the training users; and building the statistical model using a statistical machine learning algorithm, wherein the model is trained using the user characteristics of the training users, the emotions provided to the training users, and the corresponding response data;

using machine-learning-based modeling to automatically predict the emotion to which a non-training user is most likely to respond and to use the prediction to provide a promotional message to the non-training user by performing the following:

receiving user characteristics for a non-training user;

creating a vector of the user characteristics;

applying the vector of user characteristics to the statistical model to identify an emotion to which the non-training user has the greatest probability of responding; and providing the non-training user with a promotional message that includes language associated with the identified emotion.

18. The system of claim 17, wherein automatically tagging each of the promotional messages in the training data comprises comparing words and phrases in the promotional messages with a database of words and phrases with known emotional association.

19. The system of claim 18, wherein approximate matching is used to map words or phrases in the promotional messages to approximate matches in the database.

20. The system of claim 17, wherein automatically tagging each of the messages in the training data comprises:

building a second statistical model that maps features of phrases to emotional categories, wherein the model is built using features of tagged words and phrases as the input and using the emotional category as the output; and extracting features of phrases from each of the promotional messages in the training data;

for each of the promotional messages, creating a vector of the features in the message; and applying the vector to the second statistical model to classify the promotional message with an emotion or combination of emotions.

21. The system of claim 17, wherein the statistical model predicts a combination of emotions to which the non-training user has the greatest probability of responding and wherein the promotional messages provided to the non-training user includes language associated with the combination of emotions.

22. The system of claim 17, wherein the statistical model comprises a plurality of models each corresponding to one of a set of emotions, wherein the input for each model is user characteristics and the output is a probability of responding to a certain emotion.

23. The system of claim 17, wherein the statistical machine learning algorithm is one of the following: Bayesian network, linear regression, logistical regression, decision trees, k-nearest neighborhoods, random forest, gradient boost, Adaboost, neural networks, and support vector machines.

24. The system of claim 23, wherein the statistical model is training using a set of inputs and values for a target variable, wherein the set of inputs are the user characteristics of the training users and the emotions received by the training users, and the values for the target variable are the corresponding response rates of the training users for each of the emotions received.

25. A non-transitory computer-readable medium comprising a computer program, that, when executed by a computer system, enables the computer system to perform the following method for providing a promotional message to a user based on a predicted emotional response, the method comprising:

receiving user characteristics for a user;

creating a vector of the user characteristics;

accessing a statistical model that, for each of a set of emotions, predicts the probability that a user with certain characteristics will respond to the emotion;

applying the vector of user characteristics to the statistical model to identify an emotion to which the non-training user has the greatest probability of responding; and providing the non-training user with a promotional message that includes language associated with the identified emotion.

26. The non-transitory computer readable medium of claim 25, wherein the statistical model predicts a combination of emotions to which the user has the greatest probability of responding, wherein the template marketing message has a plurality of emotional variables, and wherein the instance of the template marketing message provided to the user has values corresponding to the combination of emotions predicted by the statistical model.

27. The non-transitory computer readable medium of claim 25, wherein the statistical model comprises a plurality of models each corresponding to one of a set of emotions, wherein the input for each model is user characteristics and the output is a probability of responding to a certain emotion.

28. The non-transitory computer-readable medium of claim 9, wherein providing the non-training user with a promotional message comprises:

retrieving a template marketing message that includes fixed language and an emotional variable;

retrieving a mapping of emotions to values for the emotional variable;

from the mapping, identifying the value for the emotional variable that corresponds to the emotion to which the non-training user has the greatest probability of responding;

creating an instance of the template marketing message by inserting the identified value for the emotional variable into the marketing message; and providing the instance of the template marketing message to the non-training user.

29. The non-transitory computer-readable medium of claim 28, wherein the statistical model predicts a combination of emotions to which the user has the greatest probability of responding, wherein the template marketing message has a plurality of emotional variables, and wherein the instance of the template marketing message provided to the user has values corresponding to the combination of emotions predicted by the statistical model.

30. The non-transitory computer-readable medium of claim 9, wherein providing the non-training user with a promotional message comprises using the identified emotion to select a promotional message for the non-training user from a plurality of promotional messages, each with language associated with a different emotion.

31. The non-transitory computer-readable medium of claim 9, wherein the statistical model is also used to provide new promotional messages to training users.

* * * * *